United States Patent [19]

Sherman et al.

[11] 4,236,873
[45] Dec. 2, 1980

[54] WIND TURBINE BLADE RETENTION DEVICE

[75] Inventors: Robert Sherman, West Hartford; Edward A. Rothman, South Glastonbury; William Mandelbaum, Bloomfield, all of Conn.

[73] Assignee: United Technologies Corporation, Hartford, Conn.

[21] Appl. No.: 944,222

[22] Filed: Sep. 20, 1978

[51] Int. Cl.³ .................. B64C 11/04; F03D 11/04
[52] U.S. Cl. ................................ 416/204 R; 416/248
[58] Field of Search .............. 416/204, 207, 248, 147; 403/286, 293; 285/331, 371, 398

[56] References Cited

U.S. PATENT DOCUMENTS

| 3,768 | 12/1869 | Lawton et al. | 285/371 |
|---|---|---|---|
| 1,438,413 | 12/1922 | Vessey | 416/207 |
| 2,951,541 | 9/1960 | Hinds | 416/248 |
| 3,168,144 | 2/1965 | Capowich et al. | 416/248 |
| 3,603,701 | 9/1971 | Tarcrynski | 416/204 |
| 3,734,642 | 5/1973 | Dixon | 416/248 |

Primary Examiner—Everette A. Powell, Jr.
Assistant Examiner—A. N. Trausch, III
Attorney, Agent, or Firm—John Swiatocha; Donald F. Bradley

[57] ABSTRACT

A large wind turbine rotor blade having a filament wound composite spar securely mounted to a support structure in a manner by which blade loads are transmitted via redundant load paths. Concentric inner and outer metallic adapter sleeves are bonded to the inboard end of the blade spar, and the adapter sleeves and blade spar are joined by a first series of shear bolts and nuts which pass radially through the spar. A second series of radially extending bolts and nuts join the inner and outer sleeves slightly inboard of the end of the spar. The end of the spar is of slightly reduced diameter forming a conical surface which interacts with the inner and outer sleeves to produce a positive lock when the blade is subject to centrifugal loads. The outer sleeve is adapted to be connected to the support structure by conventional techniques such as by a plurality of bolts which extend axially into the butt end of the outer sleeve.

6 Claims, 2 Drawing Figures

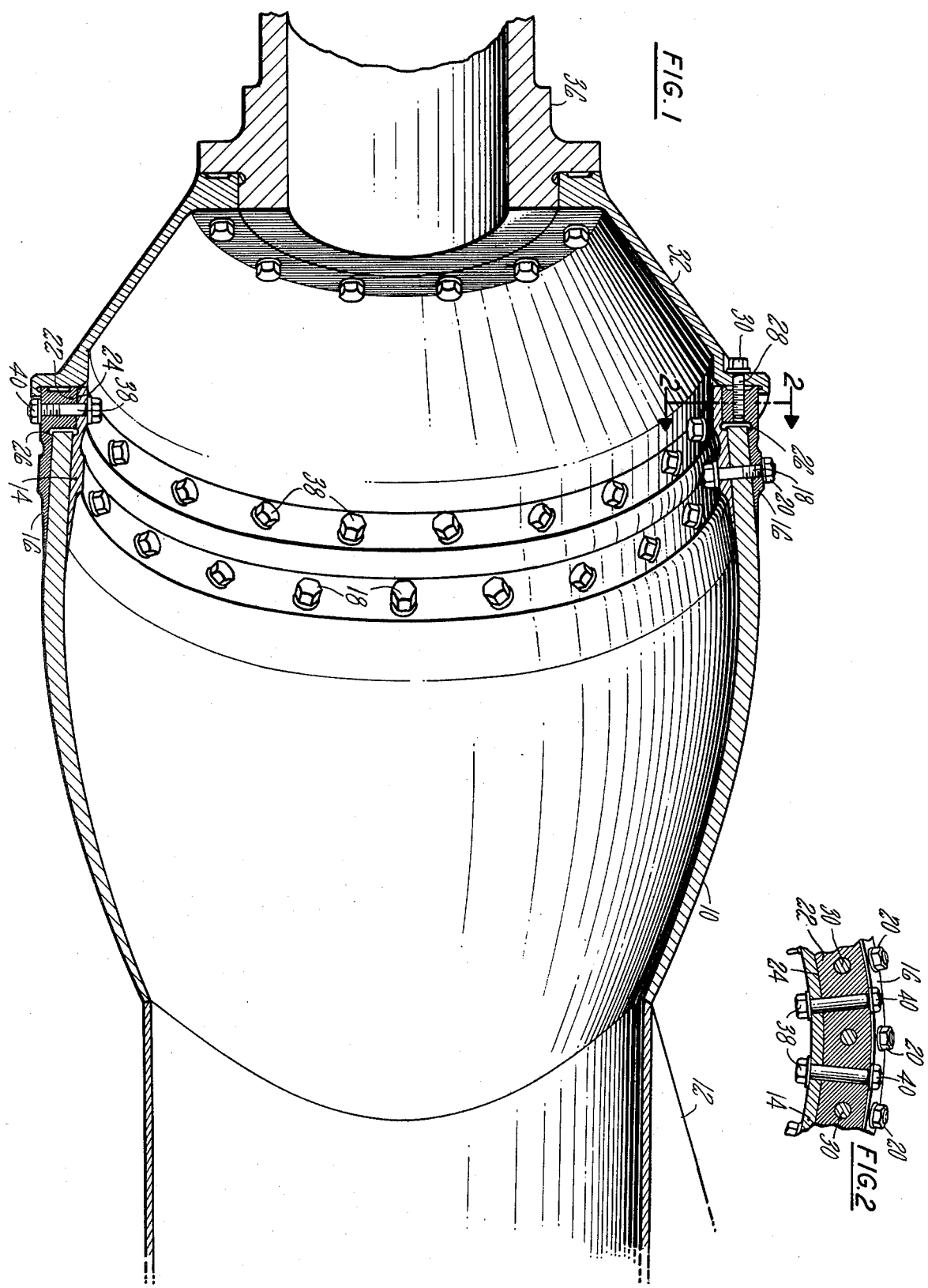

WIND TURBINE BLADE RETENTION DEVICE

The invention herein described was made in the course of or under a contract or subcontract thereunder with the National Aeronautics and Space Administration.

BACKGROUND OF THE INVENTION

Field of the Invention

This invention relates to a wind turbine blade having a spar and shell made from a filament reinforced matrix in which the spar is mounted to the hub via a novel blade retaining structure having redundant load paths which provide a highly reliable joint.

Various retention devices for rotor blades such as aeronautical propellers are known, and include mechanisms such as flanges, thrust rings, thrust bearings, locking rings and split collars. Each of these devices require some type of modification to the shank of the blade such as the machining of races or the forming of raised surfaces thereon. Furthermore, in many of these prior art retention devices the shank portion is integral with a blade pitch adjusting mechanism, and is structurally adapted to absorb and transmit both centrifugal and transverse loads from the blade and the pitch change actuators.

In the development of large rotor blades such as those for wind-driven turbines or windmills, where the rotors are often 100 to 200 feet in diameter, the blades require special fabrication techniques to reduce weight and cost. Furthermore, the large rotating blades impose severe loads on the retaining devices, and improvements in the construction of such retaining devices is desirable to insure proper distribution of the loads.

One technique for reducing blade weight and cost without compromising structural rigidity involves the use of composite materials to form the blade. A filament reinforced matrix composite blade may be produced by automated winding machines, thereby reducing the extent to which the structural integrity of the blade relies on bonded joints. Typical filamentary materials found useful are fiberglass, carbon, graphite, Kevlar and boron in matrices of epoxy or polyester. Composite tapes may also be used. With blades of this type the spar, also filament wound, is the main load-carrying element. The use of a filament winding process permits varying the wall thickness and fiber orientation for optimizing strength and stiffness along the blade, providing excellent shear characteristics and the capability of handling large loads.

Most prior art composite blades have steel spars which provide structural support to the blade along its entire length, and permit the use of standard blade retention devices including blade pitch adjusting mechanisms integral with the shank of the blade spar. With blades having filament wound spars, prior art techniques for connecting the blade to the hub are not appropriate due to the spar material differences. With composite spar blades it has been found desirable to separate the blade pitch adjusting mechanism from the blade, the blade pitch forces being transmitted from the pitch adjusting mechanism located in the hub through blade-to-hub adapters to the blade itself. Consequently the blade retention device must be able to hold securely the composite spar while at the same time transmit blade pitch forces from the pitch adjusting mechanism to the blade, and accomplish these results while absorbing the high loads resulting from the large size of the blade.

SUMMARY OF THE INVENTION

It is therefore an object of this invention to provide a blade retention device adapted to connect a blade member formed from a composite material with the rotor hub.

Another object of this invention is a blade retention device for large rotor blades formed from composite materials such as those used with wind turbines.

A further object of this invention is a blade retention device for filament wound blades in which an inner adapter sleeve is used as a part of the winding mandrel for the blade spar.

A still further object of this invention is a blade retention device for composite material rotor blades in which blade loads are transmitted to the hub via redundant paths to provide a highly reliable joint.

Another object of this invention is a blade retention device for a blade spar formed from a filament wound matrix material in which the end of the spar is formed to have a reverse locking taper to provide a secure lock under centrifugal blade loads.

In accordance with a preferred embodiment of the present invention, metallic inner and outer adapter sleeves concentric with the inboard end of the spar are bonded to the spar, and the sleeves and spar are held together by a first series of shear bolts and nuts which pass radially through the sleeves and the spar. A second series of shear bolts and nuts pass through the sleeves and join them together, the second series of nuts being located slightly inboard of the inner end of the spar. The end of the spar to which the sleeves are bonded is slightly conical and of reduced diameter relative to the adjacent outboard portion of the spar whereby the end of the spar is effectively locked between the sleeves, centrifugal forces acting on the blade tending to tighten the lock to prevent separation of the blade from the retaining sleeves.

A beneficial feature of the invention is that the inner adapter sleeve may be used as a part of the winding mandrel for the spar, the filaments or composite tapes being wound fully about the inner sleeve and later cut away at the desired point to form a clean spar end boundary. This technique enhances the winding operation and the bonding of the inner sleeve to the composite spar.

The bolts may also be bonded to the parts they join to provide a zero clearance joint which minimizes motion between components.

BRIEF DESCRIPTION OF THE DRAWING

FIG. 1 is a cross-sectional view of the blade retention device of this invention.

FIG. 2 is a view of section 2—2 of FIG. 1.

DESCRIPTION OF THE PREFERRED EMBODIMENT

Referring to FIG. 1 there is shown a blade spar 10 formed from a composite material about which is wound a blade shell 12. The preferred composition of the spar and shell is a filament wound fiberglass epoxy composite, although other filaments and matrices as well as tapes may be used. The winding may be performed by conventional techniques which do not form a portion of this invention. The blade and spar may be any size but a large wind-turbine blade having a rotor diameter in excess of 100 feet is representative. Such blades weigh in excess of 2000 pounds, and when mounted for rotation in a wind turbine produce extremely high loads on the mechanical blade retention and support structures. Most blades of this type are also adapted to be varied in pitch about the blade axis, a source of additional loading. Further loads are imposed by gusting winds which may be of differing velocities and/or directions along the blade axis or at different rotational locations. Consequently, the mechanical retention of these blades is an important factor in both safety and in the life of the blade and associated load bearing structures. The use of wound filamentary composite materials for the blade and spar reduces weight, but requires care in providing appropriate mechanical retention devices due to the unique properties of composite materials.

A blade retention device which provides redundant load paths is shown in the Figures, and comprises an inner metallic adapter sleeve 14 and an outer metallic adapter sleeve 16, the preferred material being steel. The sleeves are concentric with the blade axis, a portion of each sleeve extending adjacent to and in contact with the blade spar 10 whereby the spar 10 is sandwiched between the sleeves 14 and 16. The spar 10 is secured between the sleeves 14 and 16 by a series of shear bolts 18 and nuts 20 which extend about the circumference of the spar and pass through holes machined in the sleeves and the spar. The bolts may also be bonded to the spar and sleeves such as by inserting a small amount of a suitable epoxy in the bolt holes prior to insertion of the bolts 18. The sleeves 14 and 16 are also bonded to the spar 10 as will be discussed subsequently.

The sleeves 14 and 16 also extend a short distance beyond the inboard end of the spar 10 with the outer sleeve 16 having a flange portion 22 which extends radially inward and meets the inboard extension of the inner sleeve 14 to form a joint 24. The flange portion 22 of the outer sleeve is spaced a short distance from the inboard end of spar 10 leaving a small space 26 therebetween to avoid any direct loads between the spar end and the flange portion 22.

In addition to the series of bolts 18 which join the inner and outer sleeves 14 and 16 through the spar 10, a second series of shear bolts 38 secured by nuts 40 are inserted in holes drilled through the sleeves 14 and 16 at a point slightly inboard of the end of the spar 10. Bolts 38 may also be bonded for added strength.

The blade retention device including sleeves 14 and 16 will securely hold the blade spar 10. Some means for connecting the spar and spar retention device to the rotor hub is required. Depending on the particular construction, it may be possible to bolt the blade retention sleeve directly to the rotor hub. In many applications, however, it is necessary to provide an intermediate connecting member, an example of which is shown in FIG. 1 in which a conical connecting member 32 is bolted at one end to the blade retention device and at the other end to the hub shaft 36.

A plurality of threaded holes 28 are drilled axially through the flange portion 22 of outer sleeve 16 and threaded bolts 30 are mounted therein to secure the flanged end of the conical blade to hub connecting members 32 to the outer sleeve 16. One or more bolts 30 may be replaced by pins 34, shown in FIG. 2, to minimize relative movement and twisting loads between the outer sleeve 16 and the blade to hub connecting member 32. The bolts 30 may also be bonded in holes 28 by suitable epoxy. Bolts 30 may easily be removed when it is desired to remove the rotar blade from the hub.

The blade to hub connecting member 32 is secured by conventional means such as bolts to the hub shaft 36 which is supported by bearings, not shown, and which may be mounted for rotation about its axis to provide pitch changes to the blades. The hub is, of course, adapted to rotate in the manner of conventional rotors or propellers.

As seen best in FIG. 1, the inboard end or shank portion of spar 10 has a diameter slightly less than the immediately adjacent outboard portion of the spar so that the inboard end of the spar is slightly conical and tapered inwardly toward the hub. This construction provides a positive lock for the blade spar since centrifugal forces which tend to pull the spar out of the retention will also have a force component acting radially against the sleeves 14 and 16 which, in turn, will resist the force component and tighten the seal produced by the inner and outer sleeves, i.e., the sleeves act as a wedge to retain the spar.

As noted previously, the spar 10 is bonded to the inner and outer adapter sleeves 14 and 16. A preferred bonding technique utilizes the inner adapter sleeve 14 as part of the mandrel onto which the fiberglass is wound to form the spar 10. Initially the filamentary material is integrally wound over the inner adapter sleeve 14, and epoxy adhesive is applied to the bond surface of the sleeve 14. The filament thickness required between the inner and outer sleeves is achieved by interleaving a filamentary cloth with the filament layers. The first cloth plies are applied directly over the adhesive on the inner sleeve 14 and the first filament helical layer is wound over the cloth, with another cloth ply then applied, and another helical filament layer wound over the cloth, and so on until the desired thickness is obtained. Additional cloth layers may be used in the retention area of the spar as necessary, but the final layer is wound. In practice an external nylon peel ply is used to protect the spar surface from contamination during subsequent adapter sleeve bonding operations.

The finished spar is room temperature cured for 48 hours so that the material in the spar retention area may be machined. The end of the spar is then cut at the proper location relative to the inner sleeve since the winding process covers the entire inner sleeve with fiberglass. The spar bonding surface is then machined, and epoxy adhesive is applied to the spar and outer sleeve bonding surfaces. The outer sleeve is then pushed onto the spar to the desired radial location and held until the adhesive is cured. The bolt holes in the outer sleeve are preferably predrilled and used as bushings for drilling and reaming the holes in the spar and inner sleeve. The bolts 38 are then assembled, and the bolts 18 are later assembled when the spar mandrel is removed. Other procedures, of course, may be used.

As described, the blade retention of this invention provides two distinct paths for loads produced by the blade on the retention structure. First, the shear forces pass from the spar to the inner and outer sleeves 14 and 16 via the bonds therebetween, the load to the inner sleeve being further transmitted to the outer sleeve via bolts 38, and then to the support structure via bolts 30. Second, the bolts 18 provide another path for the same load. Hence, if one load path breaks down, the other path is capable of safely transmitting the load, and a highly reliable retention device results.

While the spar 10 and the shank portion thereof are preferably circular and hollow, other constructions may be adapted to the retention device of this invention.

While the invention has been described with respect to a preferred embodiment it is apparent that various modifications will be apparent to those skilled in the art, such modifications being within the scope of the invention as hereinafter claimed.

We claim:

1. A retention for a rotor blade, said blade having a load transmitting spar with a hollow cylindrical inboard shank contiguous therewith comprising:

a first cylindrical metallic sleeve member adapted to abut said shank about the inner periphery thereof, said first sleeve member extending slightly beyond the end of said shank, a second cylindrical metallic sleeve member adapted to abut said shank about the outer periphery thereof, said second sleeve member extending slightly beyond the end of said shank and having a radially inward extending flange portion abutting the extension of said first sleeve member adjacent the end of said shank, means for bonding said first and second sleeve members to said shank along the abutting surfaces thereof, a first plurality of bolt means located about the periphery of said shank, each of said bolt means extending radially through said sleeve members and said shank and securing said shank between said sleeve members, and a second plurality of bolt means located at a point slightly beyond the end of said shank, each of said second bolt means extending radially through and securing said first and second sleeve members in such manner that mechanical loading is transferred from said first to said second sleeve members through said second bolt means while said shank remains bonded to both said sleeve members.

2. A rotor blade retention as in claim 1 and including a connecting member having a flanged circular end portion, and means including a third plurality of bolt means located about the periphery of said connecting member and passing through the flanged portion thereof into the flanged portion of said second sleeve member axially in the plane of said shank whereby said connecting member is joined to said second sleeve member.

3. A rotor blade retention as in claim 2 in which at least one of said third plurality of bolt means is a press fit pin.

4. A rotor blade retention as in claim 1 in which said rotor blade spar including said shank is composed of a filament wound composite material.

5. A rotor blade retention as in claim 1 in which said shank is axially conical, the end of said shank having a circumference slightly smaller than the portion of the shank immediately outboard thereof, said shank being tapered in a direction whereby a portion of the load produced by centrifugal forces acting on said blade is transmitted to said sleeve members in a transverse direction causing said shank to be wedged between said sleeve members.

6. A rotor blade retention as in claim 1 in which said first and second plurality of bolt means are bonded to the respective structures joined thereby.

* * * * *